United States Patent
Tomatis

(10) Patent No.: US 11,582,942 B2
(45) Date of Patent: Feb. 21, 2023

(54) SALT DOSAGE UNIT FOR DAIRY PLANTS

(71) Applicant: CMT COSTRUZIONI MECCANICHE E TECNOLOGIA SPA, Peveragno (IT)

(72) Inventor: Stefano Tomatis, Peveragno (IT)

(73) Assignee: CMT COSTRUZIONI MECCANICHE E TECNOLOGIA SPA, Peveragno (IT)

( * ) Notice: Subject to any disclaimer, the term of this patent is extended or adjusted under 35 U.S.C. 154(b) by 981 days.

(21) Appl. No.: 16/342,352

(22) PCT Filed: Oct. 16, 2017

(86) PCT No.: PCT/EP2017/076362
§ 371 (c)(1),
(2) Date: Apr. 16, 2019

(87) PCT Pub. No.: WO2018/073178
PCT Pub. Date: Apr. 26, 2018

(65) Prior Publication Data
US 2020/0045926 A1    Feb. 13, 2020

(30) Foreign Application Priority Data

Oct. 17, 2016   (IT) .................. 102016000103739

(51) Int. Cl.
*A01J 25/16* (2006.01)
*A23C 19/064* (2006.01)

(52) U.S. Cl.
CPC .......... *A01J 25/167* (2013.01); *A23C 19/064* (2013.01)

(58) Field of Classification Search
CPC ..... A23C 19/064; A01J 25/167; A01J 25/005; A01J 25/002; A01J 25/112; A01J 25/001; A01J 25/004
See application file for complete search history.

(56) References Cited

U.S. PATENT DOCUMENTS 3,693,840 A * 9/1972 Starr ................... B65G 53/12
                                                      406/129
4,448,116 A   5/1984 Muzzarelli

FOREIGN PATENT DOCUMENTS

| DE | 940434 C    | 3/1956  |
| DE | 3021760 A1  | 12/1981 |
| FR | 1457729 A   | 1/1966  |

OTHER PUBLICATIONS

International Search Report and Written Opinion dated Nov. 30, 2017 issued in PCT/EP2017/076362.
Italian Search Report dated Jun. 29, 2017 issued in IT 201600103739, with partial translation.

* cited by examiner

*Primary Examiner* — Hong T Yoo
(74) *Attorney, Agent, or Firm* — Scully, Scott, Murphy & Presser, P.C.

(57) ABSTRACT

A hopper is closed at its lower end by a scraper which is provided with two opposite edges that laterally delimit an elongated discharge opening, a motorized rotating shaft extends parallel to the elongated discharge opening in a scraping relationship with the opposite edges, and is provided with a plurality of blind receptacles that are adapted to receive doses of salt which is loaded into the hopper, and after passing the first edge in relation to the direction of rotation of the shaft, the salt is discharged by gravity.

11 Claims, 5 Drawing Sheets

SALT DOSAGE UNIT FOR DAIRY PLANTS

The present invention relates to a salt dosage unit for dairy plants.

As is known, in automated processes for producing cheeses, salt in dry granular form can be generally added to the curd and/or pulled curd—while this advances laid on a conveyor belt—by a dedicated device that is commonly known as a dosage unit.

In one type of conventional dosage unit, a ducted screw feeder pours the salt onto a chute, or sometimes onto a vibrating channel, which is positioned above the conveyor belt on which the curd is laid. The chute is contoured so as to progressively spread out and thin the jet of salt, so as to distribute it over the entire width of the conveyor belt.

A drawback of dosage units of the above type is that the progressive spreading out of the jet of salt on the chute, although partially guided, cannot be controlled with precision, resulting in an uneven distribution along the transverse axis.

Furthermore, the flow-rate of salt fed by the screw feeder, although constant on the average in relation to the advancement speed of the conveyor belt, can undergo fluctuations linked to the presence of lumps of salt or to other contingent factors.

For the foregoing reasons, conventional dosage units like the one mentioned above are not fully satisfactory in terms of evenness of distribution of the salt on the curd.

The aim of the present invention is therefore to provide a salt dosage unit for dairy plants that overcomes the drawbacks of conventional dosage units like the one described above.

This aim and other objects, which will become better apparent hereinafter, are achieved by the salt dosage unit having the characteristics recited in the appended claim 1, while the appended dependent claims define other characteristics of the invention which are advantageous, although secondary.

Now the invention will be described in greater detail, with reference to a preferred but not exclusive embodiment thereof, which is illustrated for the purposes of non-limiting example in the accompanying drawings, wherein.

Figure 1:
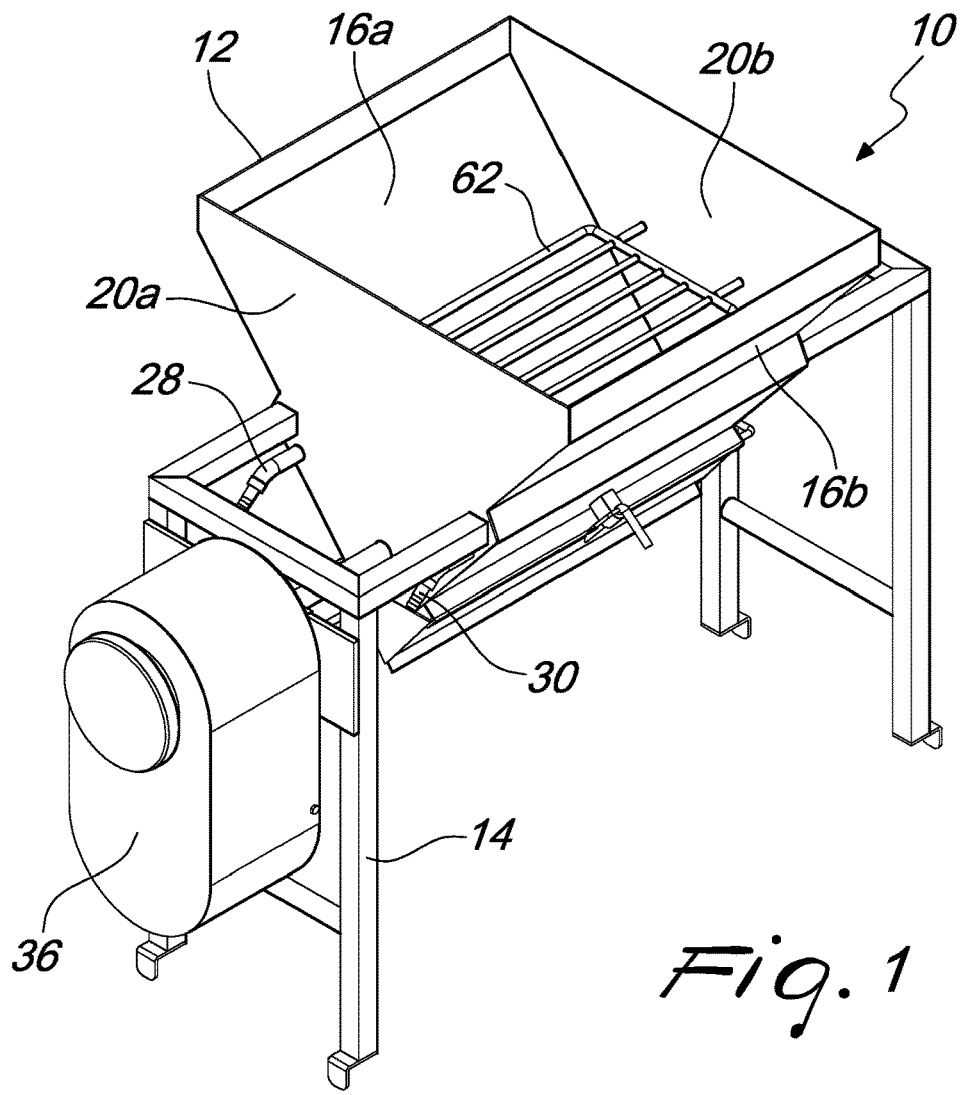
FIG. 1 is a perspective view of the salt dosage unit according to the invention.
Figure 2:
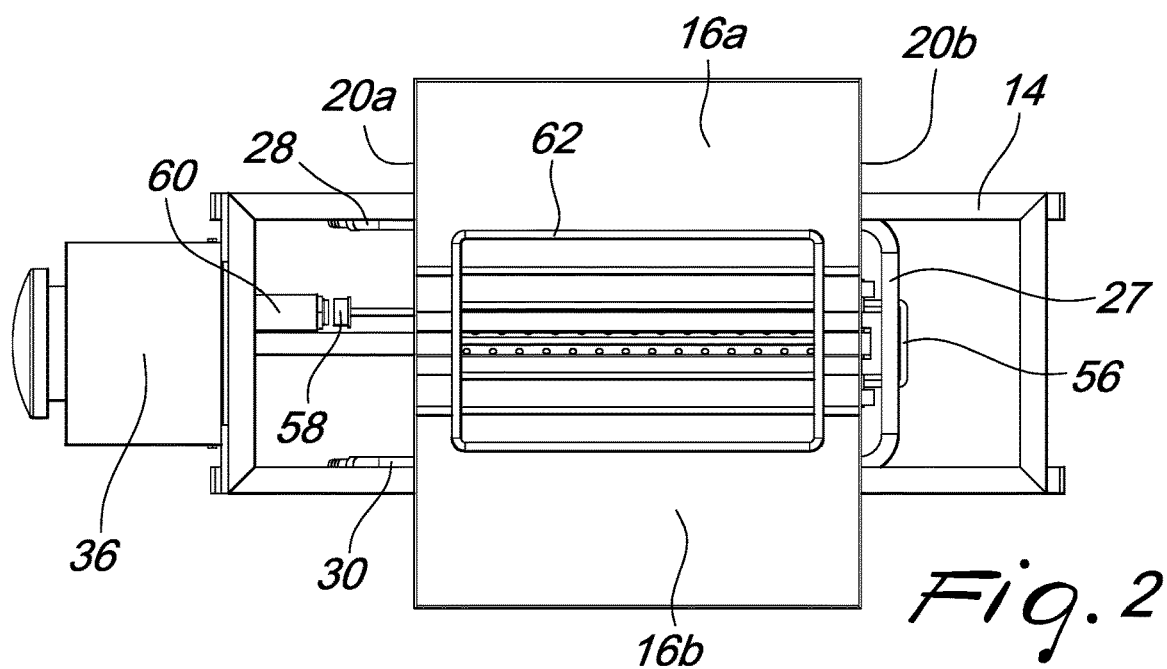
FIG. 2 is a plan view of the salt dosage unit in FIG. 1.
Figure 3:
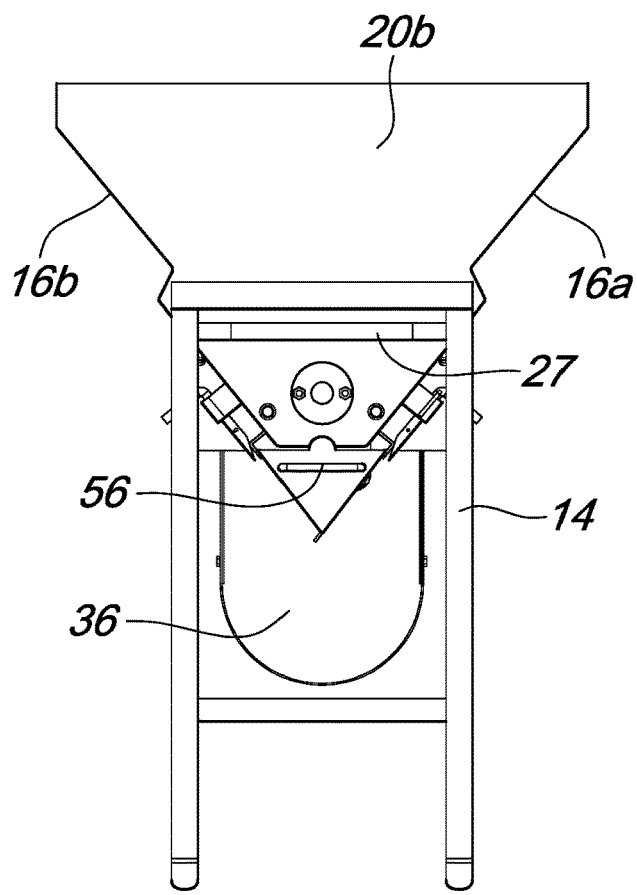
FIG. 3 is a front view of the salt dosage unit in FIG. 1.
Figure 4:
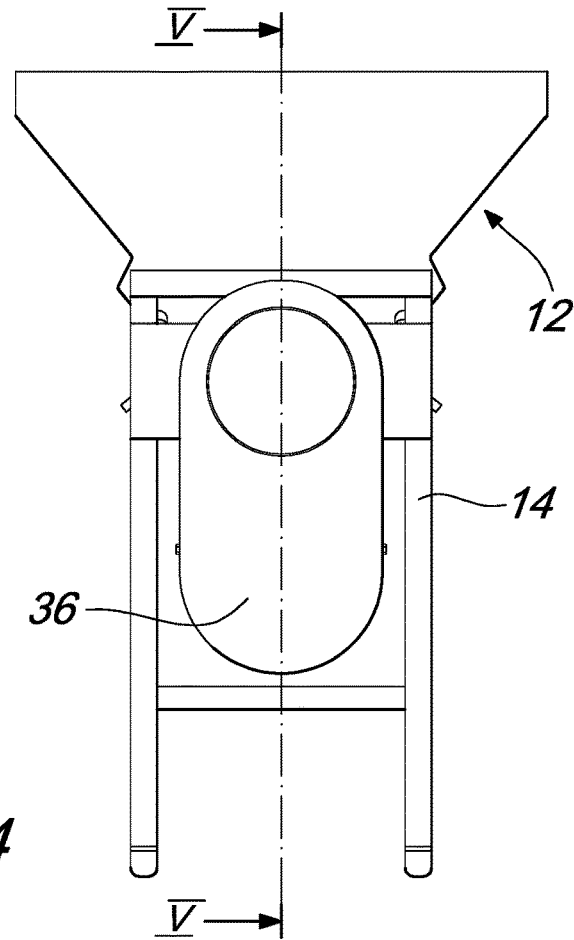
FIG. 4 is a rear view of the salt dosage unit in FIG. 1.
Figure 5:
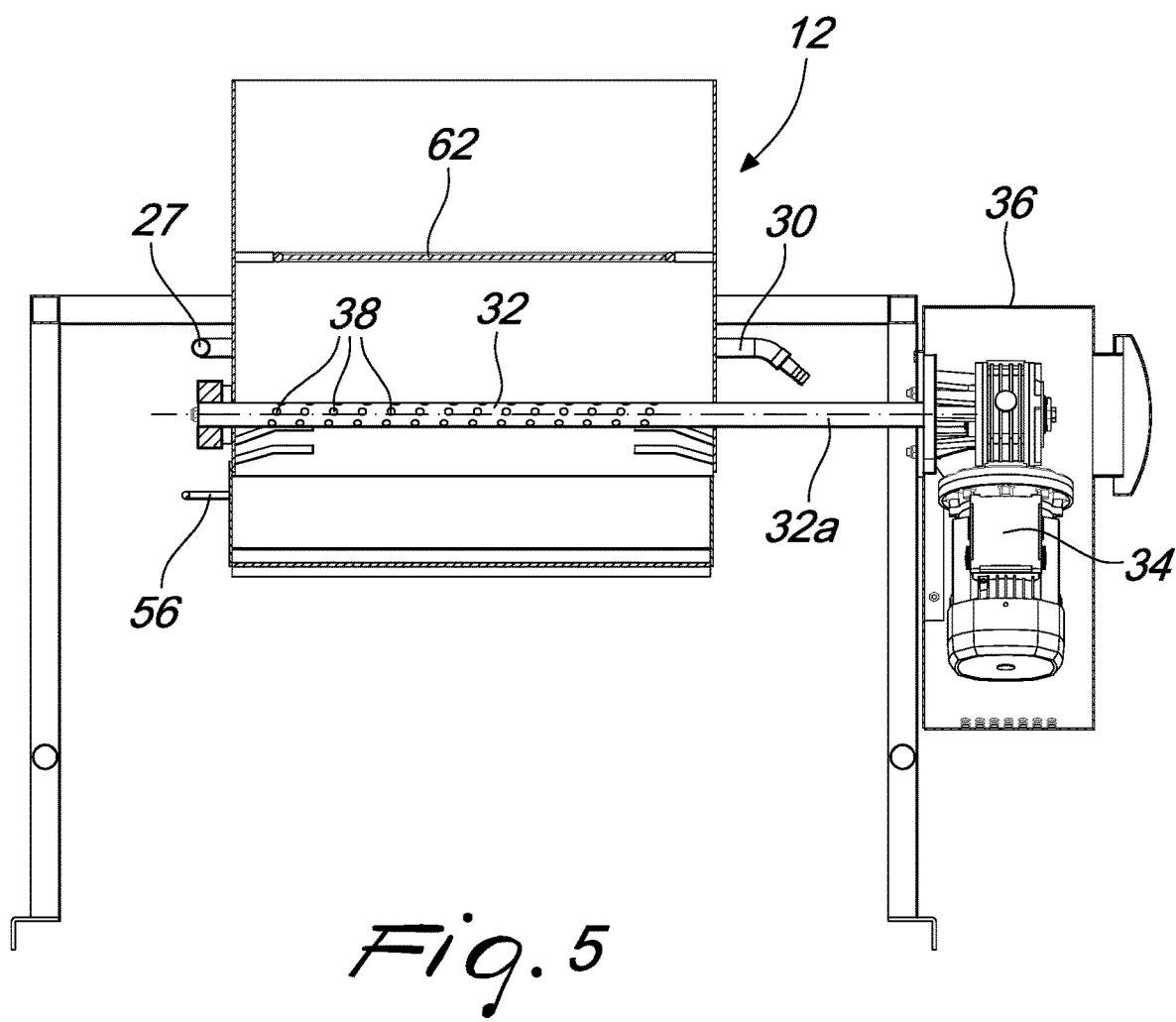
FIG. 5 is a cross-sectional view of FIG. 4 taken along the line V-V.
Figure 6:
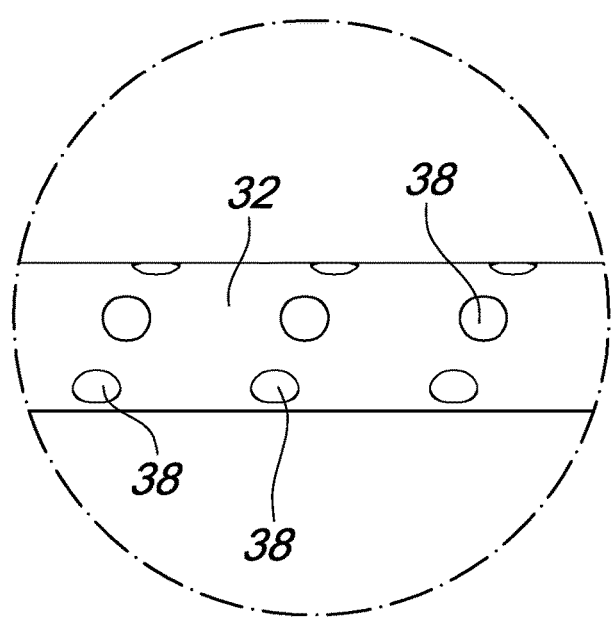
FIG. 6 is an enlarged view of a detail of FIG. 5.
Figure 7:
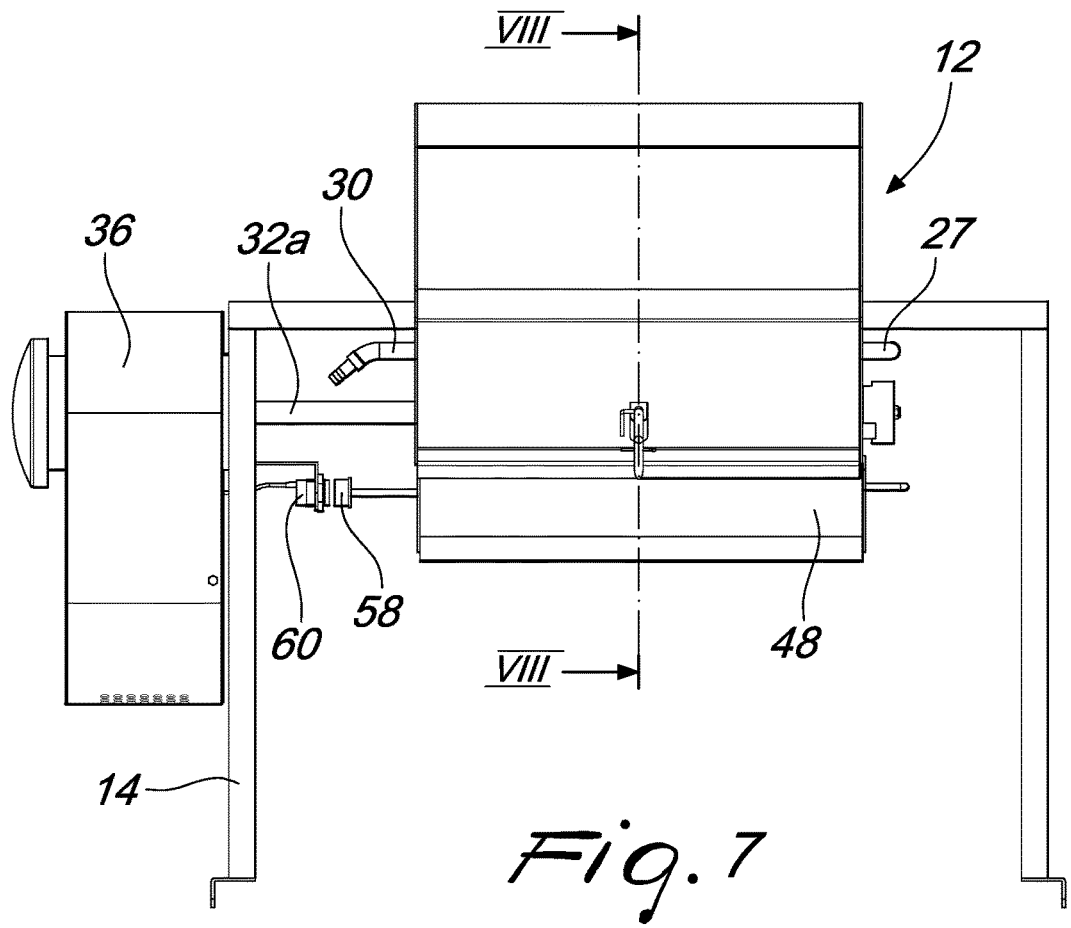
FIG. 7 is a side elevation view of the salt dosage unit in FIG. 1; p
Figure 8:
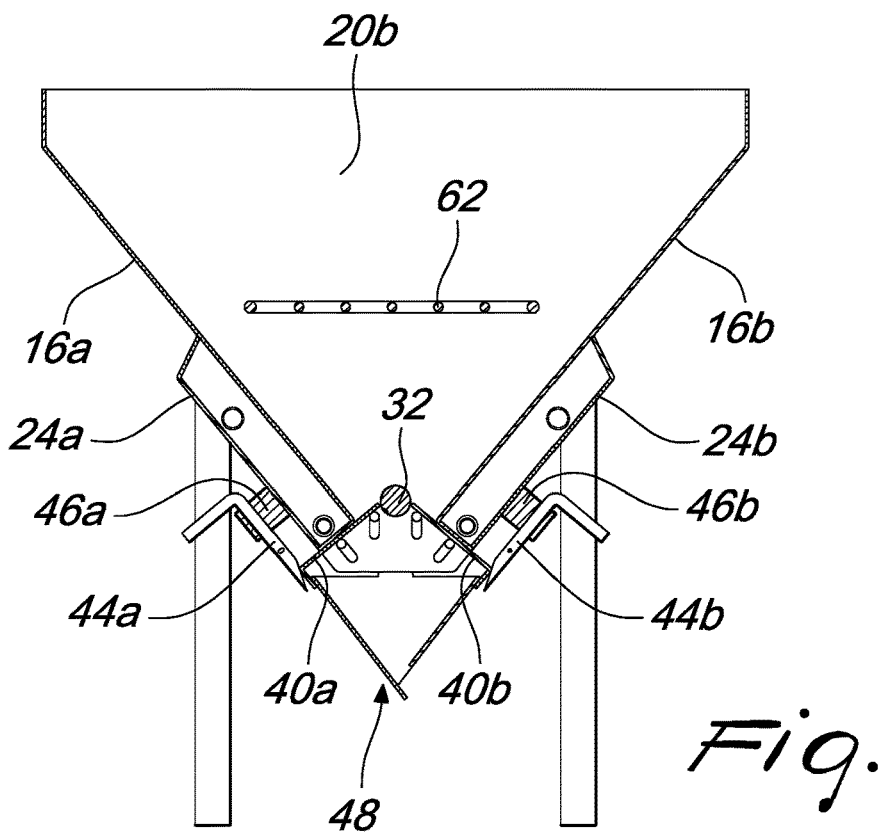
FIG. 8 is a cross-sectional view of FIG. 7 taken along the line VIII-VIII.
Figure 9:
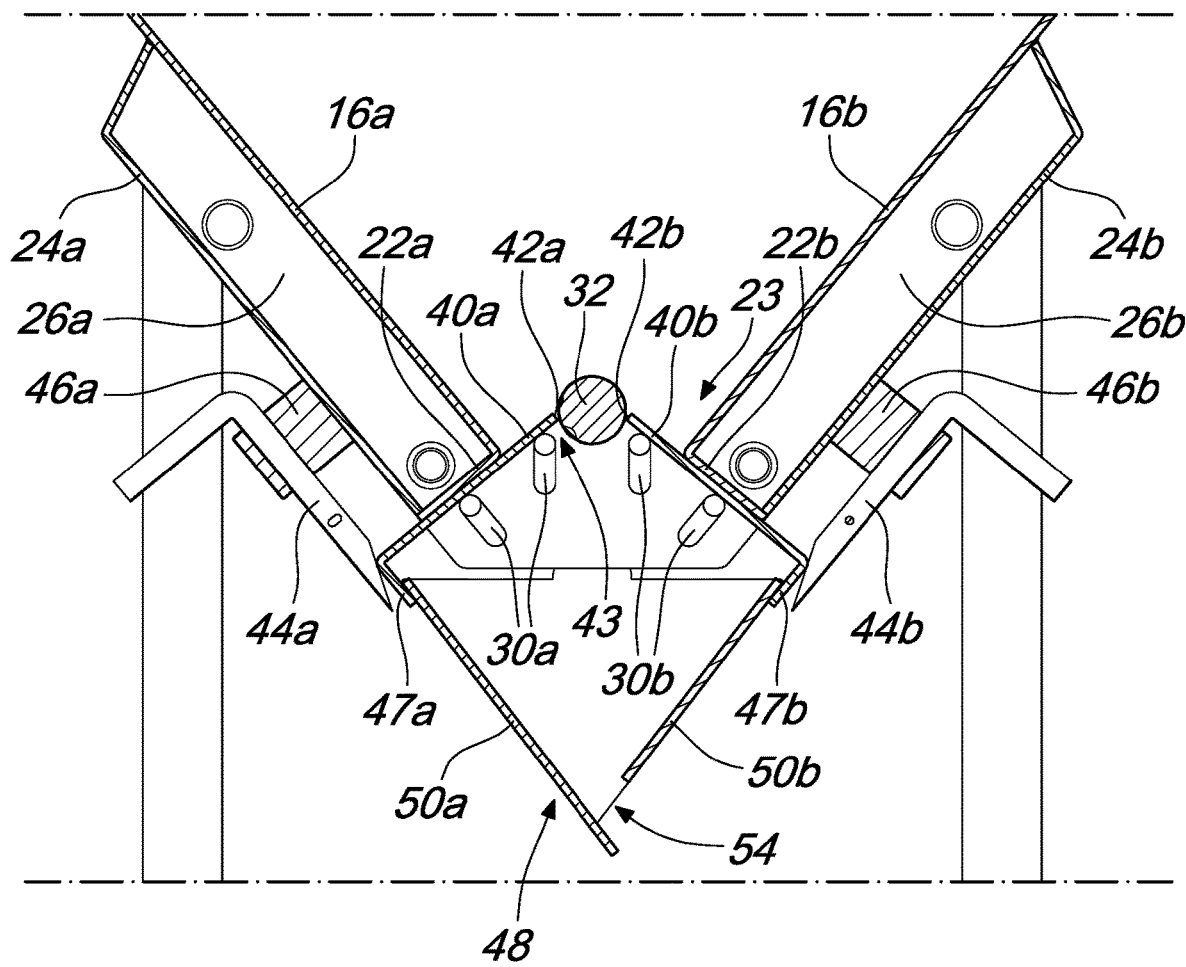
FIG. 9 is an enlarged view of a detail of FIG. 8.

With reference to the figures, a salt dosage unit 10 according to the invention comprises a hopper 12 supported in a raised position by a frame 14.

The hopper 12 in plan view has a substantially rectangular profile, with two inclined side walls 16a, 16b that converge downward and two vertical head walls 20a, 20b. The two lower edges 22a, 22b of the side walls 16a, 16b are folded outward at an angle slightly greater than 90°, to define an elongated rectangular opening 23 between them.

Lower portions of the side walls 16a, 16b are covered by respective wallboards 24a, 24b to define respective interspaces 26a, 26b. The latter are interconnected, outside the hopper 12, by a pipe 27, the opposite ends of which are connected to one of the head walls, 20b. The other end wall, 20a, is provided with a loading inlet 28 and with a discharge outlet 30 that open respectively in the interspaces 26a, 26b. By way of the loading inlet 28 and the discharge outlet 30, hot water can be circulated in the interspaces in order to heat the salt in the hopper.

A shaft 32 extends in the hopper 12 between the head walls 20a, 20b immediately above the elongated rectangular opening 23 and parallel to it. One end 32a of the shaft 32 protrudes out from the hopper 12 and is connected to a gearmotor 34 closed by a housing 36.

The shaft 32 has a plurality of blind receptacles 38 with a spherical dome profile, which are advantageously arranged in a helical array on the portion of shaft inside the hopper 12.

The elongated rectangular opening 23 is closed by scraper means that are made up advantageously of a pair of plates 40a, 40b which are provided with respective opposite edges 42a, 42b that laterally delimit an elongated discharge opening 43. The plates 40a, 40b are kept in abutment with the respective opposite edges 42a, 42b against the surface of the shaft 32, on opposite sides of it.

The plates 40a, 40b are supported obliquely between the lower edges 22a, 22b of the side walls 16a, 16b and respective pairs of tubular supports 30a, 30b.

The plates 40a, 40b are kept in abutment against the surface of the shaft 32 by respective pins 44a, 44b with wedge-shaped points, which are inserted into respective supports 46a, 46b that are welded to the wallboards 24a, 24b.

The plates 40a, 40b have respective lower edges which are folded inward to define respective guides 47a, 47b, for purposes that will be made clear below.

A drawer 48 is supported under the elongated discharge opening 43 and has a substantially rectangular profile in plan view and a cross-sectional profile that tapers downward, with two opposite sides 50a, 50b converging in a V. Between the lower edge of one of the two sides, 50b, and the opposite side, 50a, a discharge slit 54 is defined.

The drawer 48 is supported in a hanging configuration by the guides 47a, 47b of the plates 40a, 40b, on which the upper edges of the sides 50a, 50b rest.

The drawer 48 is provided with a handle 56 at one of its ends, by way of which it can be extracted by making it slide along the guides 47a, 47b, and it integrally supports a reference element 58 fixed at the opposite end.

With the drawer 48 inserted completely into the guides 47a, 47b, the reference element 58 faces a proximity sensor 60 which is fixed to the frame 14.

The rotation speed of the shaft 32 is controlled by a control unit (not shown) which is programmed to promptly stop the gearmotor 34 if the signal of the proximity sensor 60 is interrupted.

The programming of the control unit CU comes under the normal knowledge of the person skilled in the art and therefore it will not be described here.

A grating 62 is horizontally supported inside the hopper 12.

In use, the salt dosage unit 10 described above can be installed, e.g., above a generic conveyor belt (not shown) on which is laid the curd, or the pulled curd, to be salted, with the discharge slit 54 arranged transversely with respect to the advancement direction of the conveyor belt.

The salt, which can be poured into the hopper 12 manually or automatically, e.g., by a screw feeder (not shown), fills the blind receptacles 38 of the shaft 32, which give onto the interior of the hopper.

By actuating the gearmotor 34, the blind receptacles 38 filled with salt pass in sequence the first of the two opposite edges that they encounter during rotation of the shaft 32 (edge 40a or edge 40b depending on the direction of rotation), and so they discharge, by gravity, the dose of salt contained in them onto the underlying curd, through the drawer 48.

As will appear evident to the person skilled in the art, such system enables a controlled, precise and even dosing of the salt over the entire width of the curd that advances on the conveyor belt.

By varying the speed of the gearmotor 34, the amount of salt poured on the curd at each turn can be adjusted, including as a function of the advancement speed of the conveyor belt.

During the process, the salt can be kept at the optimal temperature by making hot water circulate in the interspaces 26.

Note that any attempt at disassembly of the machine while this is in operation will cause the stoppage of the gearmotor 34, ensuring safety.

In fact, the contact of the proximity sensor 60 is broken both by extracting the drawer 48, and by removing even only one of the two plates 40a, 40b, since in such case the drawer 48 would no longer be supported and would fall.

A preferred embodiment of the invention has been described, but obviously the person skilled in the art may make various modifications and variations within the scope of protection of the claims.

In particular, the distribution and the number of blind receptacles on the shaft could be varied greatly. For example, it will be possible to vary the pitch of the helix or the distance between successive blind receptacles, or indeed to arrange the blind receptacles along two or more coaxial helices.

Moreover, although the helical arrangement of the blind receptacles is advantageous, different arrangements could be employed according to requirements. For example, the receptacles could be simply aligned along one, two, or more generatrices of the surface of the shaft.

These blind receptacles, instead of having a spherical dome profile, which however is particularly advantageous for cleaning operations, could have a different profile, e.g., a cylindrical profile.

Also, the shaft could be composed of multiple coaxial sectors of different diameter, with the edge of the plates consequently contoured so as to slide in a scraping relationship with the entire surface of the shaft.

And the oblique arrangement of the plates, with the opposite edges 42a, 42b converging upward, is also useful but non indispensable, since the plates can also be arranged differently, e.g., horizontally.

These plates could be substituted by different scraper means, e.g., they could be provided monolithically at the bottom of the hopper.

It should be understood that the drawer 48, although useful for the purposes of protection, is also not indispensable to the achievement of the invention.

It should be noted that the term "scraping" in the description and in the claims must be understood in its widest meaning, generally indicating a condition of substantial sliding contact between the scraper means and the surface of the shaft, such as to cause, in the presence of salt in dry granular form in the hopper, a scraping action on the shaft.

The disclosures in Italian Patent Application No. 102016000103739 (UA2016A007375) from which this application claims priority are incorporated herein by reference.

The invention claimed is:

1. A salt dosage unit for dairy plants, comprising:
   a hopper, which is closed at its lower end by a scraper which is provided with two opposite edges that laterally delimit an elongated discharge opening, and
   a motorized rotating shaft, which extends parallel to said elongated discharge opening in a scraping relationship with said opposite edges, and is provided with a plurality of blind receptacles that are adapted to receive doses of salt which is loaded into the hopper and, after passing a first of said opposite edges in relation to the direction of rotation of the shaft, to discharge the doses of salt by gravity.

2. The salt dosage unit according to claim 1, wherein said blind receptacles are arranged in a helical array.

3. The salt dosage unit according to claim 1, wherein said blind receptacles have a spherical dome profile.

4. The salt dosage unit according to claim 1, wherein said scraper comprises a pair of plates, which are supported at a bottom of said hopper and are each provided with a respective one of said opposite edges.

5. The salt dosage unit according to claim 4, wherein said plates are arranged obliquely, with said opposite edges converging upward.

6. The salt dosage unit according to claim 4, wherein said plates are kept in abutment against a surface of the motorized rotating shaft by respective wedge-shaped devices.

7. The salt dosage unit according to claim 1, further comprising a drawer which is supported below said elongated discharge opening and has a profile that tapers downward and ends in a discharge slit.

8. The salt dosage unit according to claim 7, wherein said drawer is supported in a hanging configuration along upper edges of two opposite sides thereof by a pair of guides which are respectively integral with said plates.

9. The salt dosage unit according to claim 7, further comprising a control unit comprising a sensor configured to stop rotation of said shaft in response to a movement of said drawer.

10. The salt dosage unit according to claim 9, wherein said sensor comprises a reference surface which is integral with either said drawer or said hopper, and a proximity sensor which is integral with the other of said drawer or said hopper.

11. The salt dosage unit according to claim 1, wherein said hopper is at least partially covered by counter walls that define an interspace that is adapted to be supplied with a warm fluid to heat material in the hopper.

* * * * *